United States Patent
Endo et al.

(10) Patent No.: US 12,344,343 B2
(45) Date of Patent: Jul. 1, 2025

(54) STRADDLED VEHICLE

(71) Applicant: YAMAHA HATSUDOKI KABUSHIKI KAISHA, Iwata (JP)

(72) Inventors: Hayato Endo, Shizuoka (JP); Katsuya Haruta, Shizuoka (JP); Kazuya Sugimoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 488 days.

(21) Appl. No.: 17/874,518

(22) Filed: Jul. 27, 2022

(65) Prior Publication Data

US 2023/0312040 A1 Oct. 5, 2023

(30) Foreign Application Priority Data

Apr. 4, 2022 (JP) ................................. 2022-062265

(51) Int. Cl.
*B62J 25/06* (2020.01)

(52) U.S. Cl.
CPC ..................... *B62J 25/06* (2020.02)

(58) Field of Classification Search
CPC ....................................................... B62J 25/06
See application file for complete search history.

(56) References Cited

U.S. PATENT DOCUMENTS

| | | | | |
|---|---|---|---|---|
| 7,111,375 | B2 * | 9/2006 | Buckhouse | G05G 1/60 74/564 |
| 8,256,788 | B2 * | 9/2012 | Matsushima | B62J 25/04 280/291 |
| 9,540,066 | B1 * | 1/2017 | Bloomer | B62J 25/04 |
| 11,148,751 | B2 * | 10/2021 | Laberge | B62K 5/05 |
| 11,772,735 | B2 * | 10/2023 | Shikanai | B62J 25/06 280/291 |
| 2021/0024162 | A1 * | 1/2021 | Lindloff | B62J 25/06 |
| 2023/0087371 | A1 * | 3/2023 | Seko | B62J 25/06 180/11 |
| 2023/0312039 | A1 * | 10/2023 | Bando | B62J 25/00 |

FOREIGN PATENT DOCUMENTS

| | | | | |
|---|---|---|---|---|
| CN | 209192116 U | * | 8/2019 | |
| EP | 2960144 A1 | * | 12/2015 | B62J 25/00 |
| JP | 2008062720 A | * | 3/2008 | |
| JP | 2011005954 A | * | 1/2011 | |
| JP | 2018-158659 A | | 10/2018 | |
| WO | WO-2023089903 A1 | * | 5/2023 | |

* cited by examiner

*Primary Examiner* — Valentin Neacsu
*Assistant Examiner* — Hosam Shabara
(74) *Attorney, Agent, or Firm* — Rabin & Berdo, P.C.

(57) ABSTRACT

A straddled vehicle includes a vehicle body frame, a bracket, and a footrest. The bracket is attached to the vehicle body frame. The footrest is movably supported by the bracket to be in one of an expanded position and a folded position. In the expanded position, the footrest extends outward from the vehicle body frame in the left-right direction. In the folded position, the footrest is rotated upward from the expanded position. The bracket includes a base portion and an extending portion. The base portion is disposed along the vehicle body frame. The extending portion extends outward from the base portion in the left-right direction. The footrest includes a contact portion that contacts the bracket at the folded position. The extending portion includes a receiving surface that contacts the contact portion, and that is located at an outer edge in the left-right direction of the extending portion.

11 Claims, 14 Drawing Sheets

STRADDLED VEHICLE

CROSS-REFERENCE TO RELATED APPLICATIONS

This application is based on, and claims priority from, Japanese Patent Application No. 2022-062265, filed on Apr. 4, 2022. The contents of the application is incorporated herein by reference.

TECHNICAL FIELD

The present invention relates to a straddled vehicle.

BACKGROUND ART

A straddled vehicle is equipped with a footrest for a rider to place his/her foot on. The footrest is attached to a vehicle body frame of the straddled vehicle via a bracket. The bracket movably supports the footrest between an expanded position and a folded position. In a state where the footrest is located at the expanded position, the rider places his/her foot on the footrest. The footrest moves to the folded position by being flipped up from the expanded position.

For example, the straddled vehicle disclosed in Japanese Patent Application Publication No. 2018-158659 has a step as a footrest and a step bracket. The step bracket includes a base portion and a protruding portion. The base portion is attached to the vehicle body frame. The protruding portion protrudes outward from the base portion in the left-right direction of the straddled vehicle. The step bracket rotatably supports the step at the expanded position and the folded position. When the step is flipped up from the expanded position, the step stops at the folded position by contacting the base portion of the step bracket. That is, a receiving surface that serves as a stopper for the step is provided on the surface of the base portion.

SUMMARY OF THE INVENTION

If the footrest is violently flipped up while the straddled vehicle is running, the footrest may bite into the bracket and the footrest may not return to the expanded position. As a result of diligent research, the inventors of the present invention have found that the angle of the receiving surface of the bracket affects the biting of the footrest. Therefore, by setting the receiving surface at an appropriate angle, it is possible to suppress the biting of the footrest.

However, in a case where the receiving surface is provided on the surface of the base portion as in the above-mentioned straddled vehicle, it is not easy to set the receiving surface at a desired angle. Therefore, for example, it is conceivable to set the receiving surface at a desired angle by providing a protrusion including the receiving surface on the surface of the base portion. However, in this case, the complicated shape of the bracket reduces the degree of freedom in the manufacturing method of the bracket. For example, in a low-cost manufacturing method such as extrusion processing or press processing, it is not easy to manufacture the bracket having the complicated shape as described above, and a high-cost manufacturing method such as aluminum forging is required.

Further, the footrest has a contact portion that contacts the receiving surface, but the footrest is disposed away from the base portion. Therefore, the contact portion has a shape that extends long from the footrest toward the receiving surface. As a result, the weight of the footrest increases.

An object of the present invention is to suppress biting of a footrest and reduce a weight of the footrest while suppressing a decrease in a degree of freedom of a bracket manufacturing method.

A straddled vehicle according to one aspect of the present invention includes a vehicle body frame, a bracket, and a footrest. The bracket is attached to the vehicle body frame. The footrest is movably supported by the bracket between an expanded position and a folded position. The footrest extends outward from the vehicle body frame in a left-right direction of the straddled vehicle at the expanded position. The folded position is a position where the footrest is rotated upward from the expanded position. The bracket includes a base portion and an extending portion. The base portion is disposed along the vehicle body frame. The extending portion extends outward from the base portion in the left-right direction. The footrest includes a contact portion that contacts the bracket at the folded position. The extending portion includes a receiving surface that contacts the contact portion. The receiving surface is located at an outer edge in the left-right direction of the extending portion.

In the straddled vehicle according to the present aspect, the receiving surface is located at the outer edge in the left-right direction at the extending portion of the bracket. Therefore, the angle of the receiving surface is arbitrarily set by adjusting the shape of the outer edge of the extending portion. Therefore, the receiving surface can be easily set at an appropriate angle in order to suppress biting of the footrest. Further, since the base portion of the bracket does not have a protrusion for providing the receiving surface, the bracket has a simple structure. As a result, the decrease in the degree of freedom in the bracket manufacturing method is suppressed. In addition, the outer edge of the extending portion is located closer to the footrest than the base. Therefore, the receiving surface is disposed closer to the footrest than the base portion. As a result, the footrest is made lighter by making the contact portion smaller.

The base portion may have a flat plate shape. The extending portion may have a flat plate shape. The bracket may have a bent shape between the base portion and the extending portion. In this case, since the bracket has a simple shape, the degree of freedom in the manufacturing method is improved.

The receiving surface may be inclined with respect to a surface of the base portion. In this case, the biting force is reduced by adjusting the inclination angle of the receiving surface.

The contact portion may have a flat shape provided on an outer side surface of the footrest. In this case, the footrest is made lighter because the contact portion does not have a shape extending toward the receiving surface.

In a case where the footrest is located at the folded position, a first component force may be smaller than a second component force. The first component force is a component force of a load acting on the receiving surface from the contact portion in a direction parallel to the receiving surface. The second component force is a component force of the load in a direction perpendicular to the receiving surface. In this case, since the biting force from the footrest to the bracket is small, biting of the footrest into the bracket is suppressed.

In a case where the footrest is located at the folded position, a component force of a load acting on the receiving surface from the contact portion in a direction parallel to the receiving surface may be zero. In this case, since the biting force is small, biting of the footrest into the bracket is suppressed.

The bracket may be made of a material that is less stiff than the footrest. The bracket may be made of aluminum. In this case, the bracket is made lighter. Further, since aluminum is soft, biting is likely to occur, but in the straddled vehicle according to the present aspect, biting is suppressed even if the bracket is made of aluminum.

The footrest may be made of stainless steel, chrome molybdenum steel, or titanium. In this case, the strength of the footrest is improved. Further, since stainless steel, chrome molybdenum steel, or titanium is hard, biting is likely to occur. However, in the straddled vehicle according to the present aspect, biting is suppressed even if the footrest is made of stainless steel, chrome molybdenum steel, or titanium.

The extending portion may rotatably support the footrest. In this case, the extending portion has both a function of supporting the footrest and a function of a stopper.

A footrest support structure for a straddled vehicle including a vehicle body frame according to another aspect of the present invention includes a bracket and a footrest. The bracket is attached to the vehicle body frame. The footrest is movably supported by the bracket between an expanded position and a folded position. The footrest extends outward from the vehicle body frame in the left-right direction at the expanded position. The folded position is a position where the footrest is rotated upward from the expanded position. The bracket includes a base portion and an extending portion. The base portion is disposed along the vehicle body frame. The extending portion extends outward from the base portion in the left-right direction. The footrest includes a contact portion that contacts the bracket at the folded position. The extending portion includes a receiving surface that contacts the contact portion. The receiving surface is located at an outer edge in the left-right direction of the extending portion.

DESCRIPTION OF EMBODIMENTS

Figure 1:
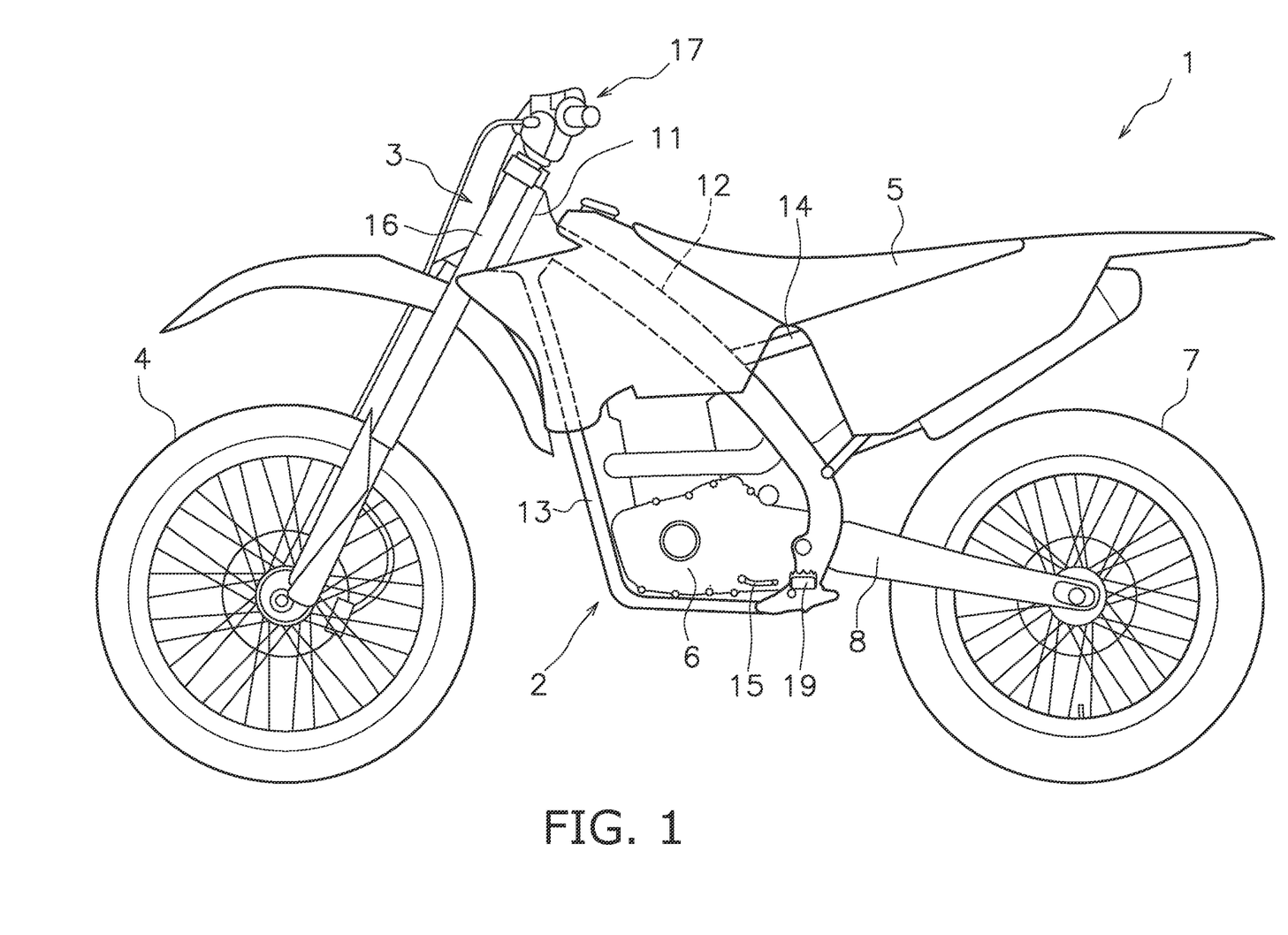
FIG. 1 is a side view of a straddled vehicle according to an embodiment.

Hereinafter, a straddled vehicle according to an embodiment will be described with reference to the drawings. FIG. 1 is a side view of the straddled vehicle 1 according to the embodiment. The straddled vehicle 1 is a so-called off-road type motorcycle. As shown in FIG. 1, the straddled vehicle 1 includes a vehicle body frame 2, a steering device 3, a front wheel 4, a seat 5, a power unit 6, a rear wheel 7, and a swing arm 8. In the present embodiment, the front-back and left-right directions mean the front-back and left-right directions as seen from a rider seated on the seat 5.

The vehicle body frame 2 includes a head pipe 11, a first main frame 12, a second main frame 13, and a rear frame 14. The head pipe 11 extends forward and downward. The first main frame 12 is connected to the head pipe 11. The first main frame 12 extends from the head pipe 11 through the rear of the power unit 6. The first main frame 12 extends rearward and downward.

The second main frame 13 is connected to the head pipe 11. The second main frame 13 extends from the head pipe 11 through the front of the power unit 6. The rear frame 14 is connected to the first main frame 12. The rear frame 14 extends rearward and upward from the first main frame 12.

The steering device 3 is rotatably supported by the head pipe 11. The steering device 3 is configured to be steered by the rider. The steering device 3 includes a front fork 16 and a handle member 17. The front fork 16 rotatably supports the front wheel 4. The front fork 16 is rotatably supported by the head pipe 11. The handle member 17 is connected to the front fork 16. The handle member 17 is operable left and right by the rider.

The seat 5 is disposed behind the head pipe 11. The seat 5 is supported by the vehicle body frame 2. The power unit 6 is disposed below the seat 5. The power unit 6 is supported by the first main frame 12 and the second main frame 13. The power unit 6 includes, for example, an internal combustion engine. The power unit 6 may include an electric motor.

A footrest 19 is disposed below the seat 5. The footrest 19 is connected to the first main frame 12. The footrest 19 projects laterally from the first main frame 12. A shift pedal 15 is disposed in front of the footrest 19. Although only the left footrest 19 is shown in FIG. 1, a footrest symmetrical with the footrest 19 is also disposed on the right side of the straddled vehicle 1.

The power unit 6 generates a driving force for rotating the rear wheel 7. The rear wheel 7 is disposed behind the power unit 6. The rear wheel 7 is connected to the first main frame 12 via the swing arm 8. The swing arm 8 is swingably supported by the first main frame 12. The rear wheel 7 is rotatably supported by the swing arm 8.

Figure 2:
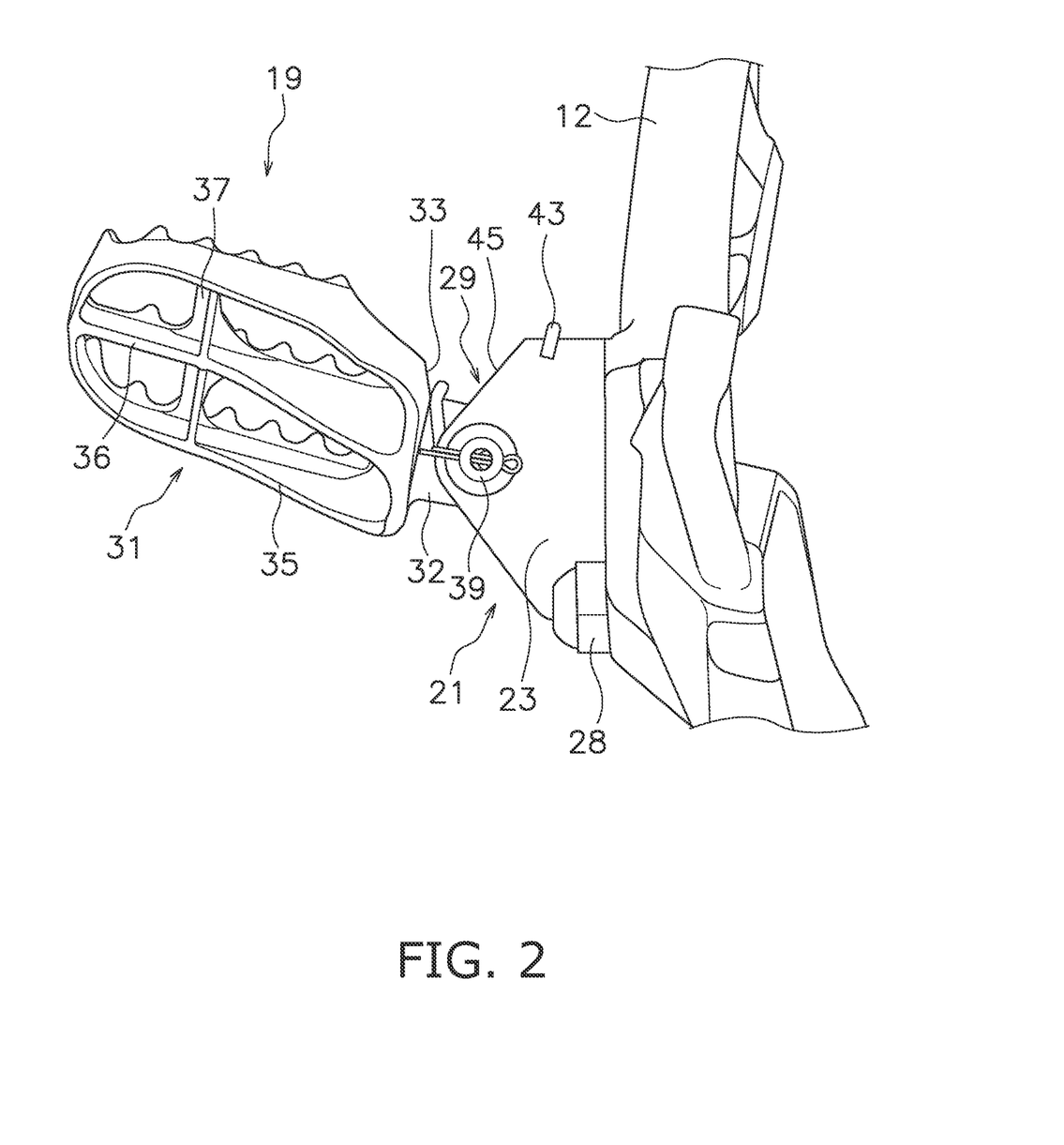
FIG. 2 is a rear view showing a footrest support structure at an expanded position.
Figure 3:
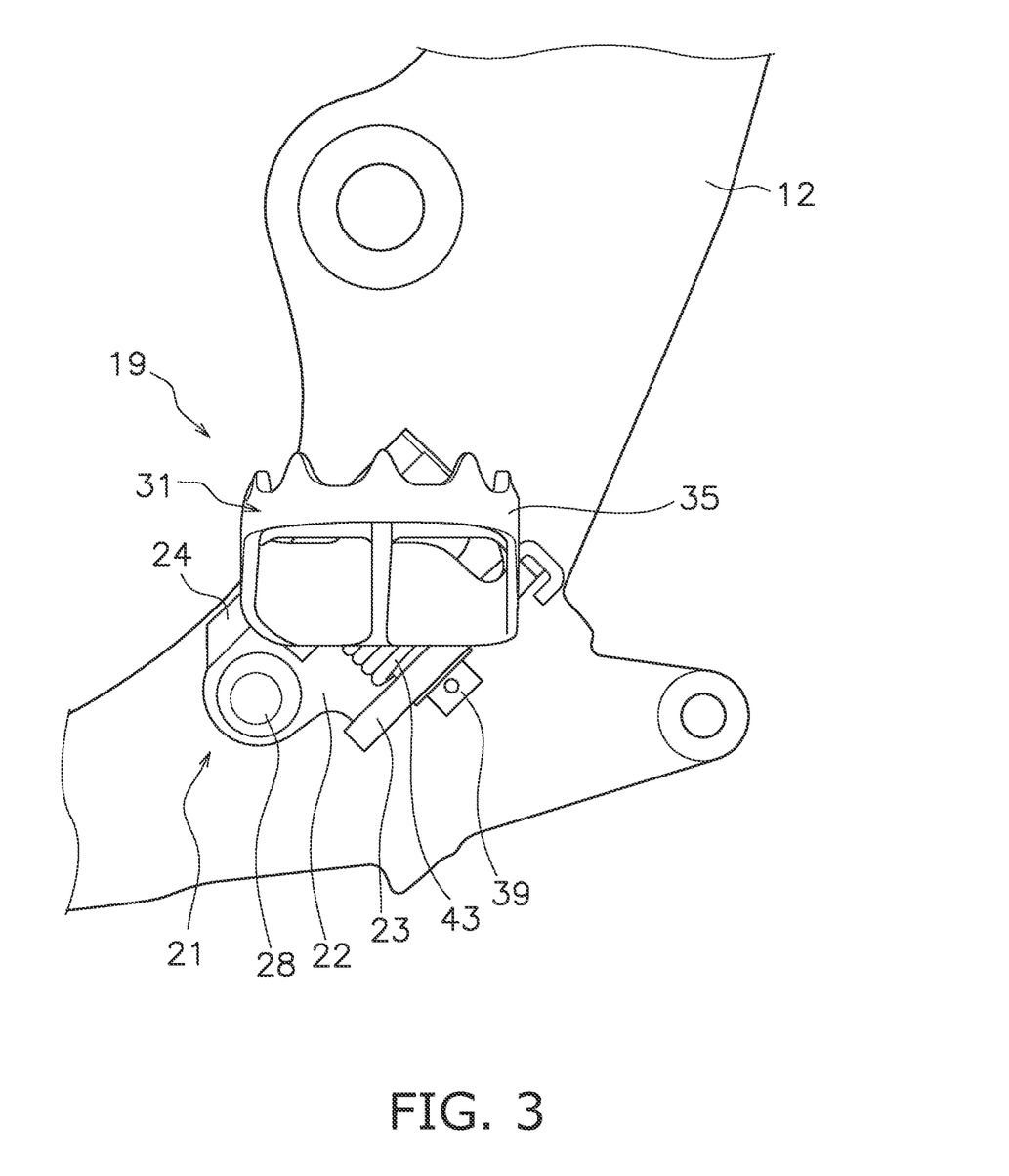
FIG. 3 is a side view showing the footrest support structure at the expanded position.
Figure 4:
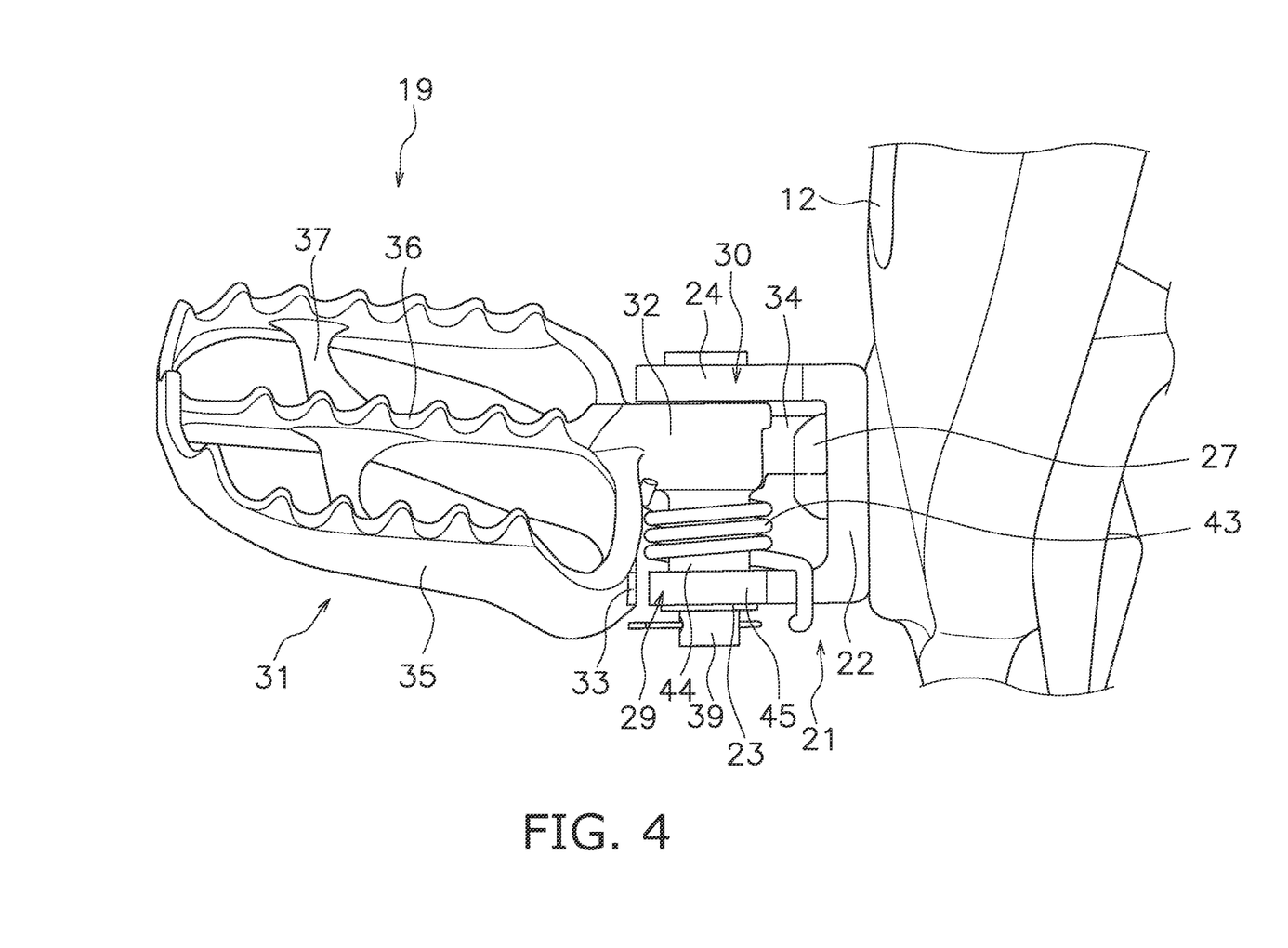
FIG. 4 is a top view showing the footrest support structure at the expanded position.

Next, a footrest support structure of the straddled vehicle 1 will be described. The footrest 19 is movably supported between an expanded position and a folded position. FIG. 2 is a rear view showing the footrest support structure at the expanded position. FIG. 3 is a side view showing the footrest support structure at the expanded position. FIG. 4 is a top view showing the footrest support structure at the expanded position. As shown in FIGS. 2 to 4, the footrest 19 extends outward in the left-right direction from the first main frame 12 at the expanded position.

Figure 5:
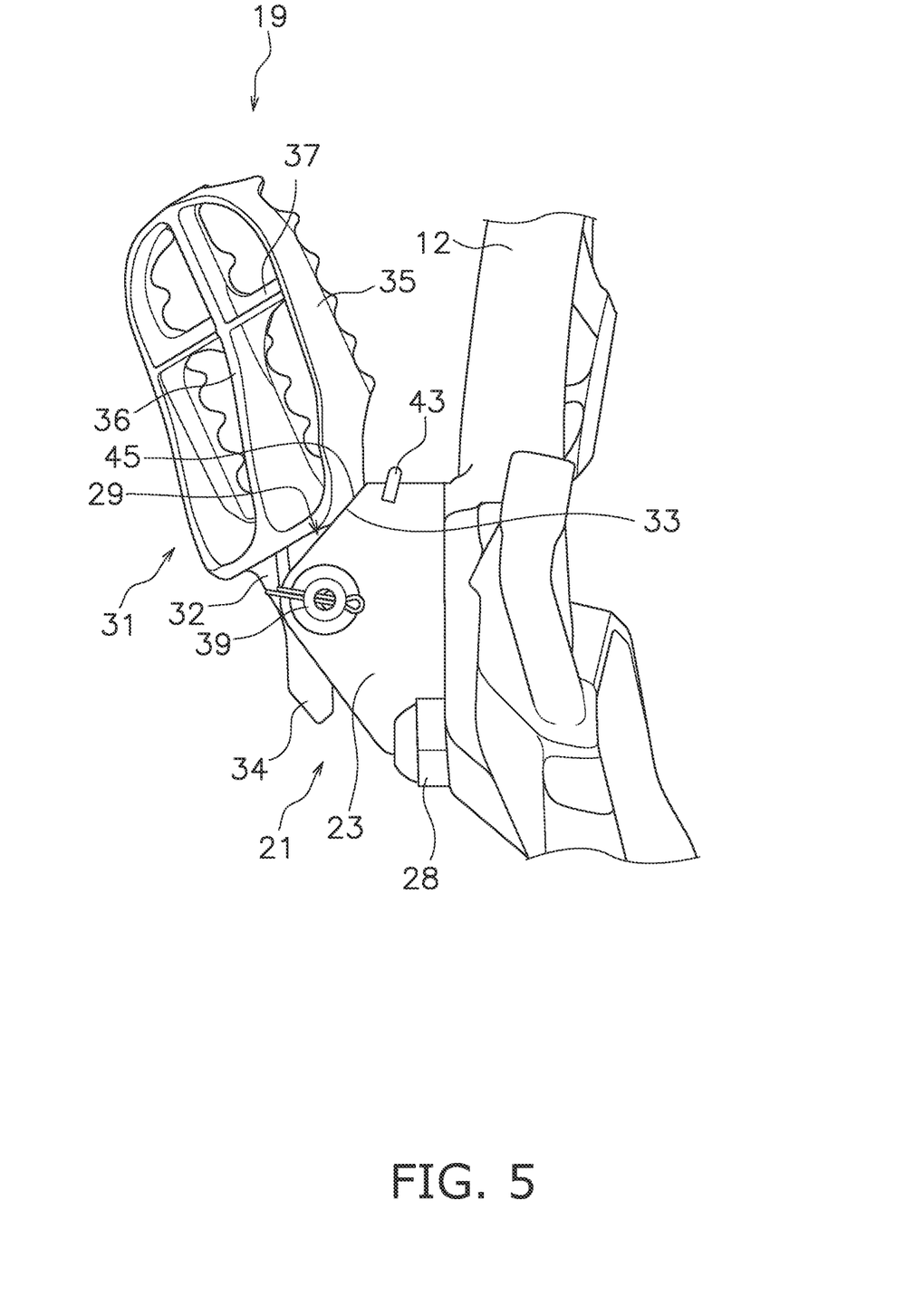
FIG. 5 is a rear view showing the footrest support structure at a folded position.
Figure 6:
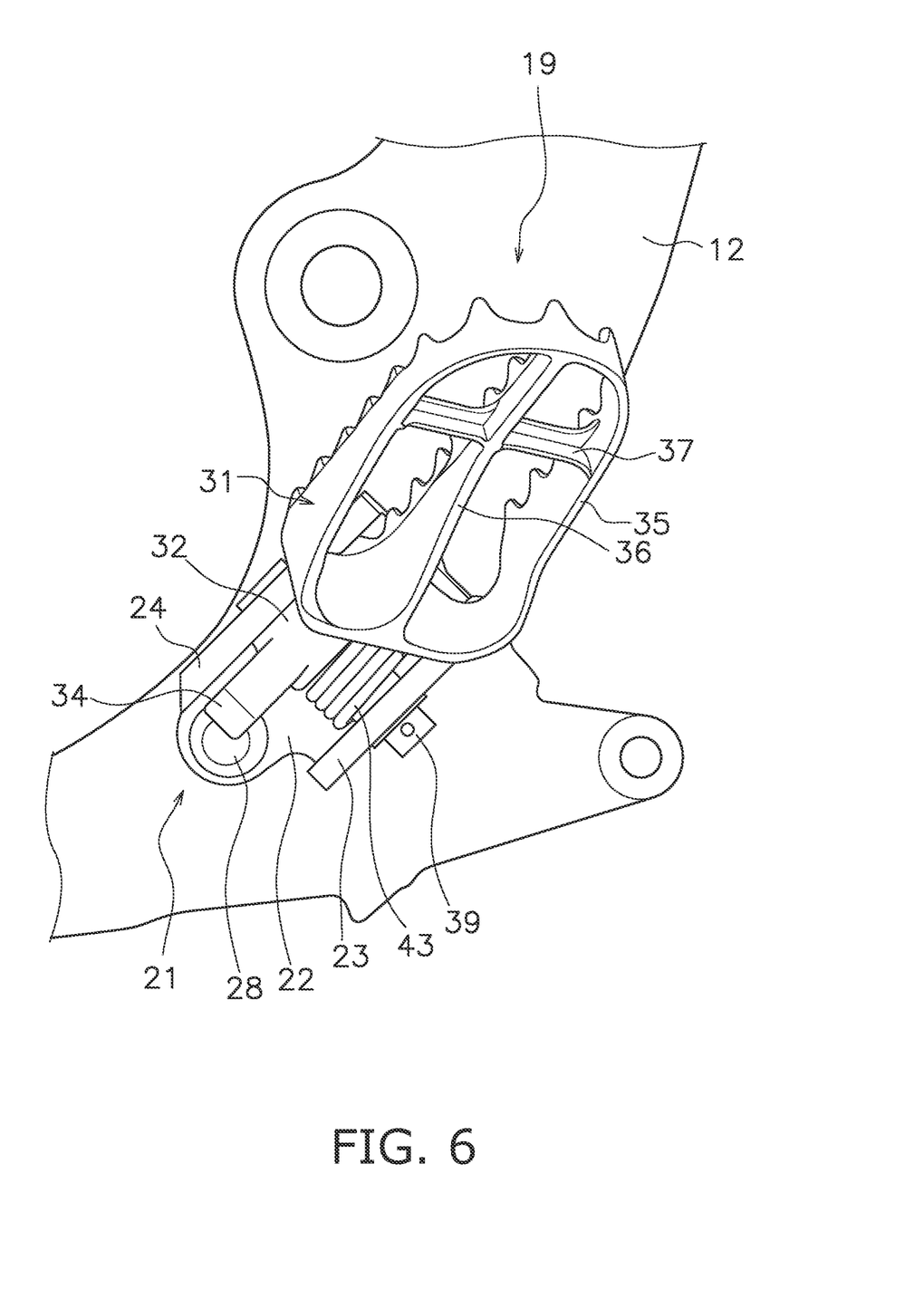
FIG. 6 is a side view showing the footrest support structure at the folded position.

FIG. 5 is a rear view showing the footrest support structure at the folded position. FIG. 6 is a side view showing the footrest support structure at the folded position. As shown in FIGS. 5 and 6, the footrest 19 extends upward from the first main frame 12 at the folded position. The footrest 19 rotates upward from the expanded position to move to the folded position.

As shown in FIGS. 2 to 6, the footrest support structure includes a bracket 21 and the footrest 19 described above.

Figure 7:
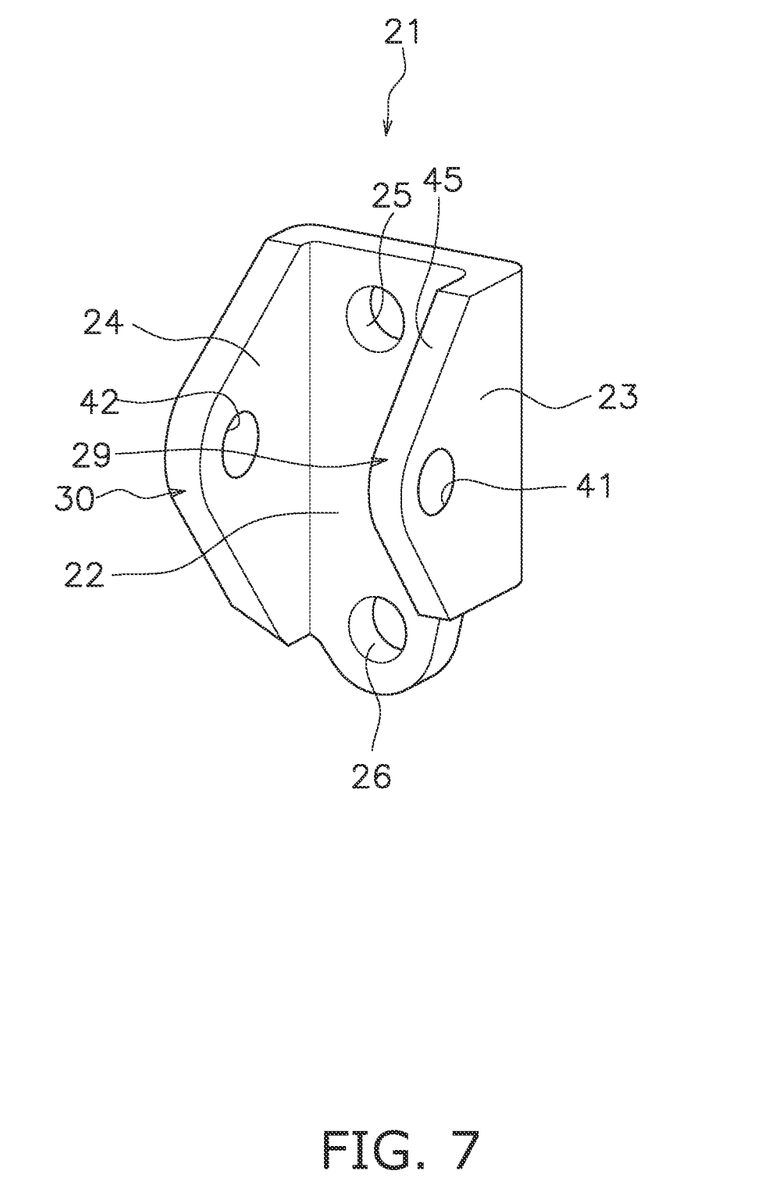
FIG. 7 is a perspective view of a bracket.
Figure 8:
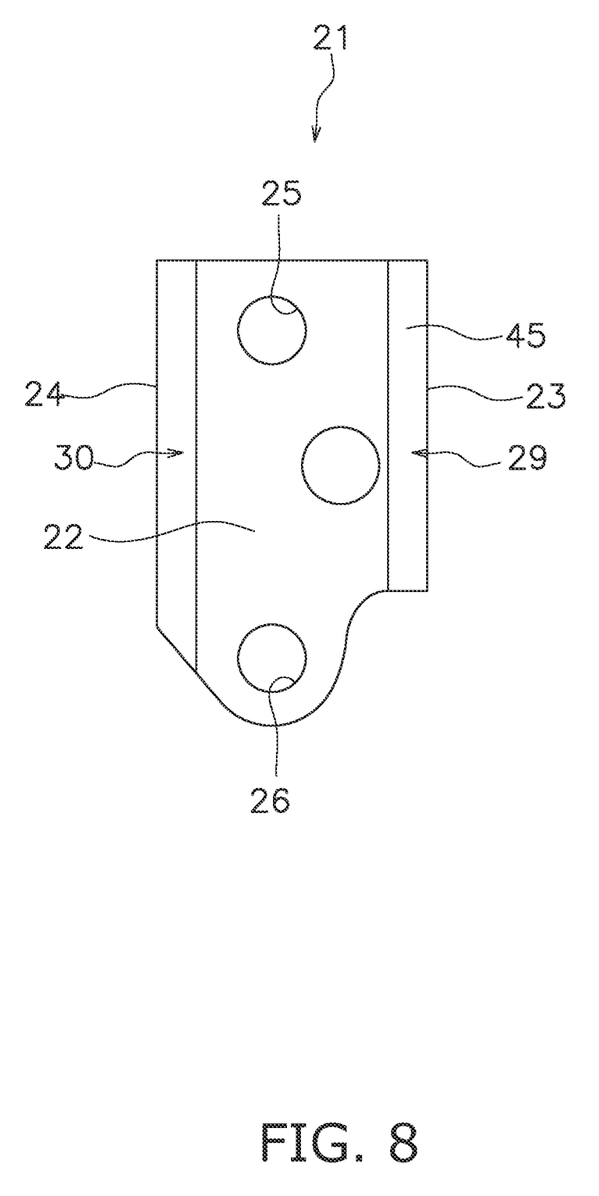
FIG. 8 is a side view of the bracket.

The bracket 21 is attached to the first main frame 12. The footrest 19 is movably supported by the bracket 21 between the expanded position and the folded position. FIG. 7 is a perspective view of the bracket 21. FIG. 8 is a side view of the bracket 21. As shown in FIGS. 7 and 8, the bracket 21 has a bent plate shape. The bracket 21 has a U-shaped bent shape.

The bracket 21 is made of a material having a lower hardness than the footrest 19. For example, the bracket 21 is made of aluminum and the footrest 19 is made of chrome molybdenum steel. Alternatively, the footrest 19 may be made of stainless steel or titanium. The bracket 21 is formed, for example, by extrusion. Alternatively, the bracket 21 may be formed by another method such as press working.

The bracket 21 includes a base portion 22, a first extending portion 23, and a second extending portion 24. The base portion 22 is disposed along the first main frame 12. The base portion 22 has a flat plate shape. The base portion 22 is attached to the first main frame 12. The base portion 22 includes mounting holes 25 and 26. The base portion 22 is fixed to the first main frame 12 by screws 27 and 28 inserted into the mounting holes 25 and 26.

The first extending portion 23 extends outward from the base portion 22 in the left-right direction. The first extending portion 23 has a flat plate shape. The bracket 21 has a bent shape between the base portion 22 and the first extending portion 23. The first extending portion 23 includes a first outer edge 29. The first outer edge 29 is located at an outer lateral side end of the first extending portion 23 in the left-right direction. The first outer edge 29 has a shape that tapers outward in the left-right direction as seen in a vehicle rear view.

The second extending portion 24 is disposed in front of the first extending portion 23. The second extending portion 24 extends outward from the base portion 22 in the left-right direction. The second extending portion 24 has a flat plate shape. The bracket 21 has a bent shape between the base portion 22 and the second extending portion 24. The second extending portion 24 includes a second outer edge 30. The second outer edge 30 is located at an outer lateral side end of the second extending portion 24 in the left-right direction. The second outer edge 30 has a shape that tapers outward in the left-right direction as seen in the vehicle rear view.

Figure 9:
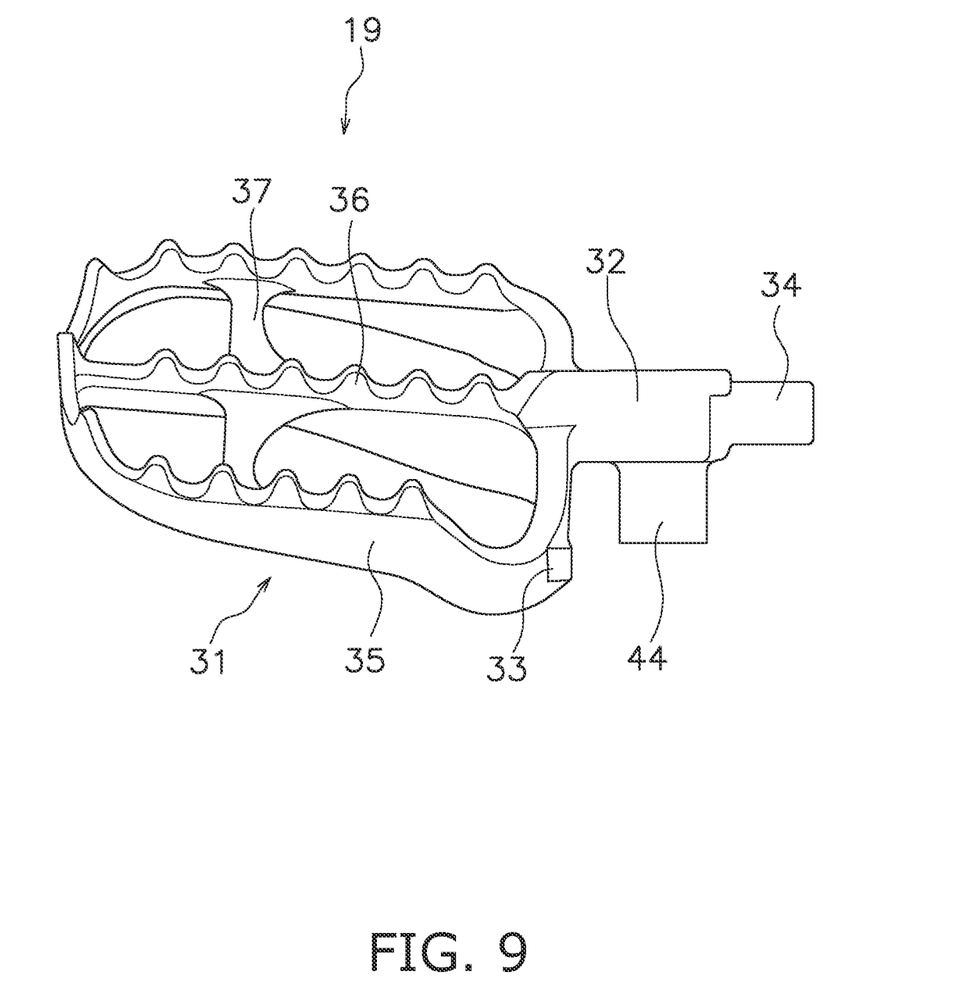
FIG. 9 is a perspective view of a footrest.
Figure 10:
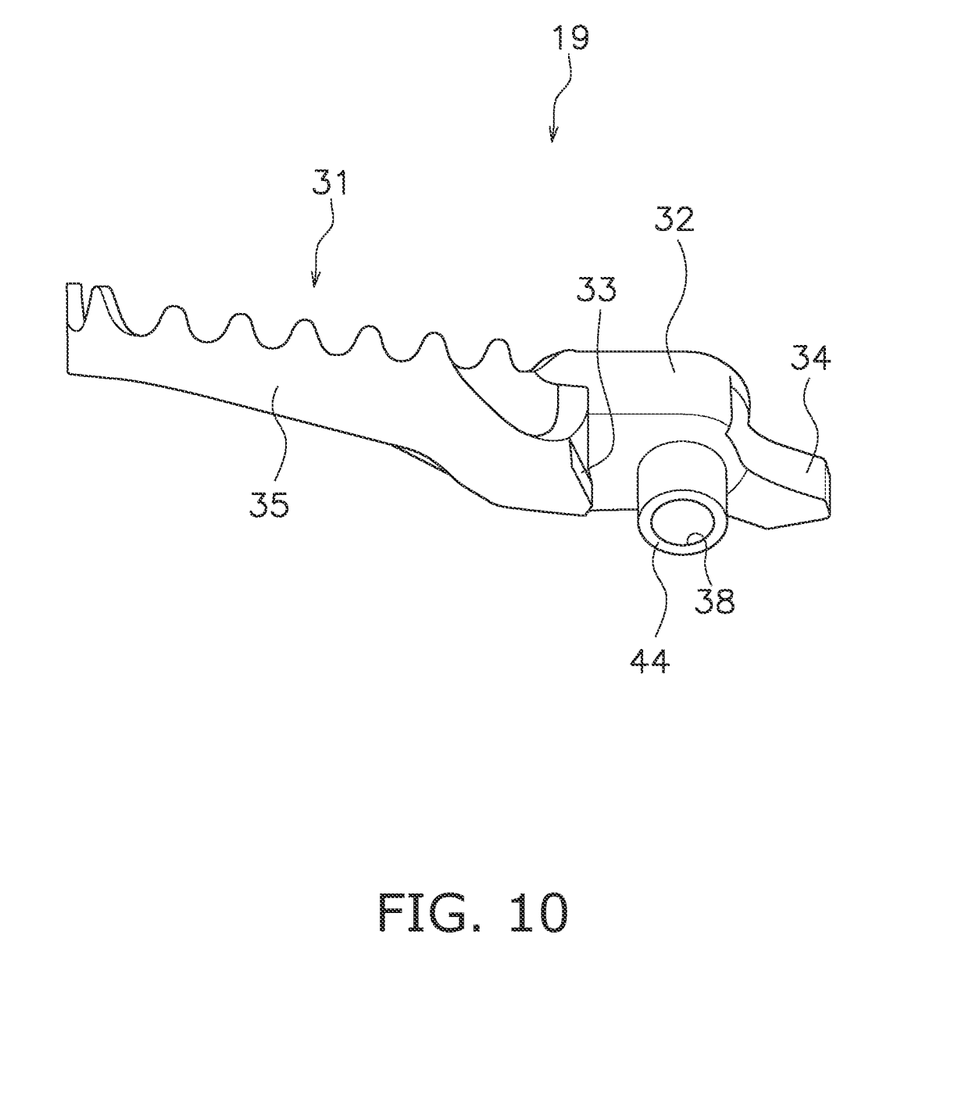
FIG. 10 is a rear view of the footrest.

FIG. 9 is a perspective view of the footrest 19. FIG. 10 is a rear view of the footrest 19. As shown in FIGS. 9 and 10, the footrest 19 includes a footrest body 31, a connecting portion 32, a first contact portion 33, and a second contact portion 34. The footrest body 31 is a portion on which the rider puts his/her foot. An upper surface of the footrest body 31 has a non-slip shape including a plurality of protrusions.

The footrest body 31 includes an outer frame 35, a first cross member 36, and a second cross member 37. The outer frame 35 has a loop shape. The first cross member 36 is disposed in the outer frame 35. The first cross member 36 extends in the left-right direction and is connected to the outer frame 35. The second cross member 37 is disposed in the outer frame 35. The second cross member 37 extends in the front-rear direction and is connected to the outer frame 35.

The connecting portion 32 is connected to the footrest body 31. The connecting portion 32 projects inward in the left-right direction from the footrest body 31. The connecting portion 32 is disposed between the first extending portion 23 and the second extending portion 24. As shown in FIG. 10, the connecting portion 32 includes a through hole 38. The through hole 38 extends in the front-rear direction at the connecting portion 32. A support shaft 39 is passed through the through hole 38. The connecting portion 32 is supported by the bracket 21.

As shown in FIG. 7, the first extending portion 23 includes a first support hole 41. The second extending portion 24 includes a second support hole 42. The support shaft 39 is passed through the first support hole 41 and the second support hole 42. The first extending portion 23 and the second extending portion 24 rotatably support the footrest 19 via the support shaft 39.

As shown in FIG. 4, a spring 43 is attached to the connecting portion 32 and the bracket 21. The spring 43 urges the footrest 19 toward the expanded position. The connecting portion 32 includes a boss 44. As shown in FIG. 4, the boss 44 is inserted into the spring 43 and supports the spring 43. An end of the spring 43 is supported by an upper end of the first extending portion 23.

Figure 11:
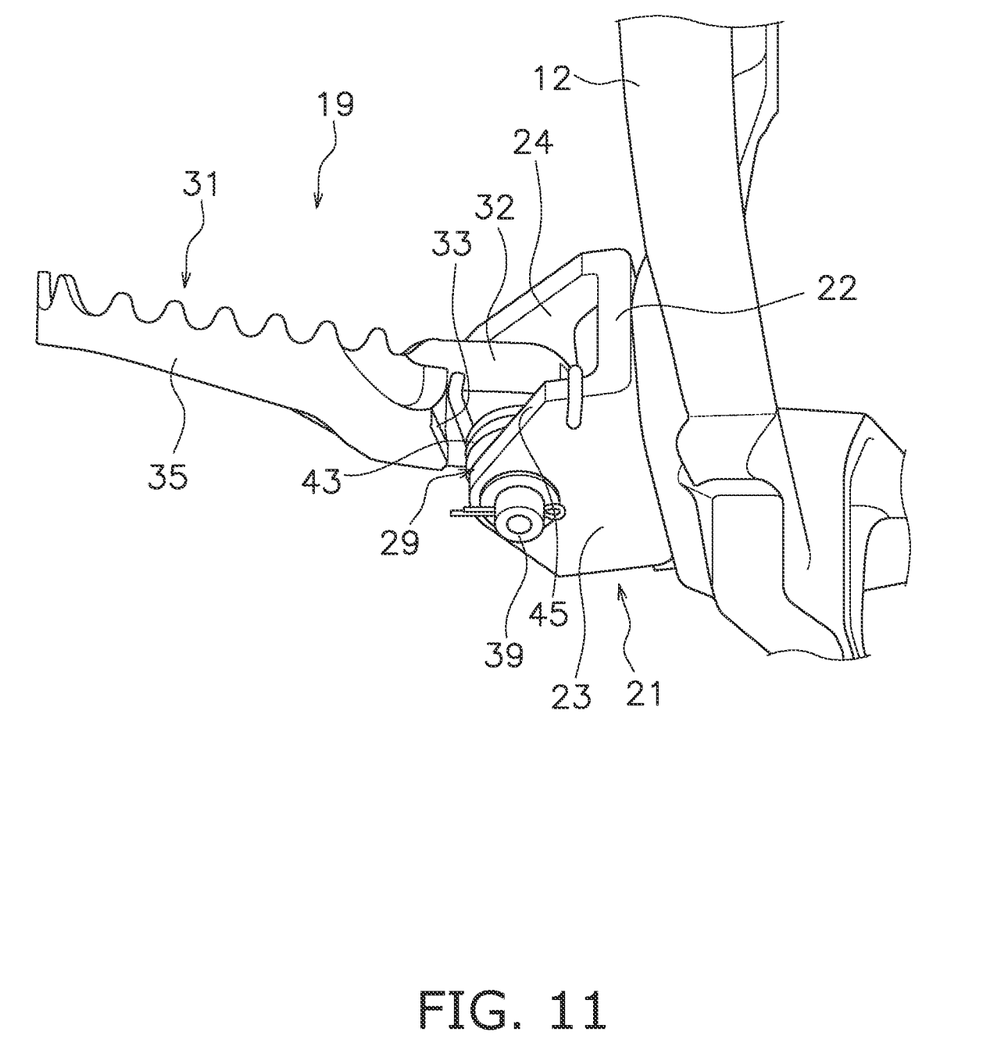
FIG. 11 is a perspective view showing the footrest support structure at the expanded position.
Figure 12:
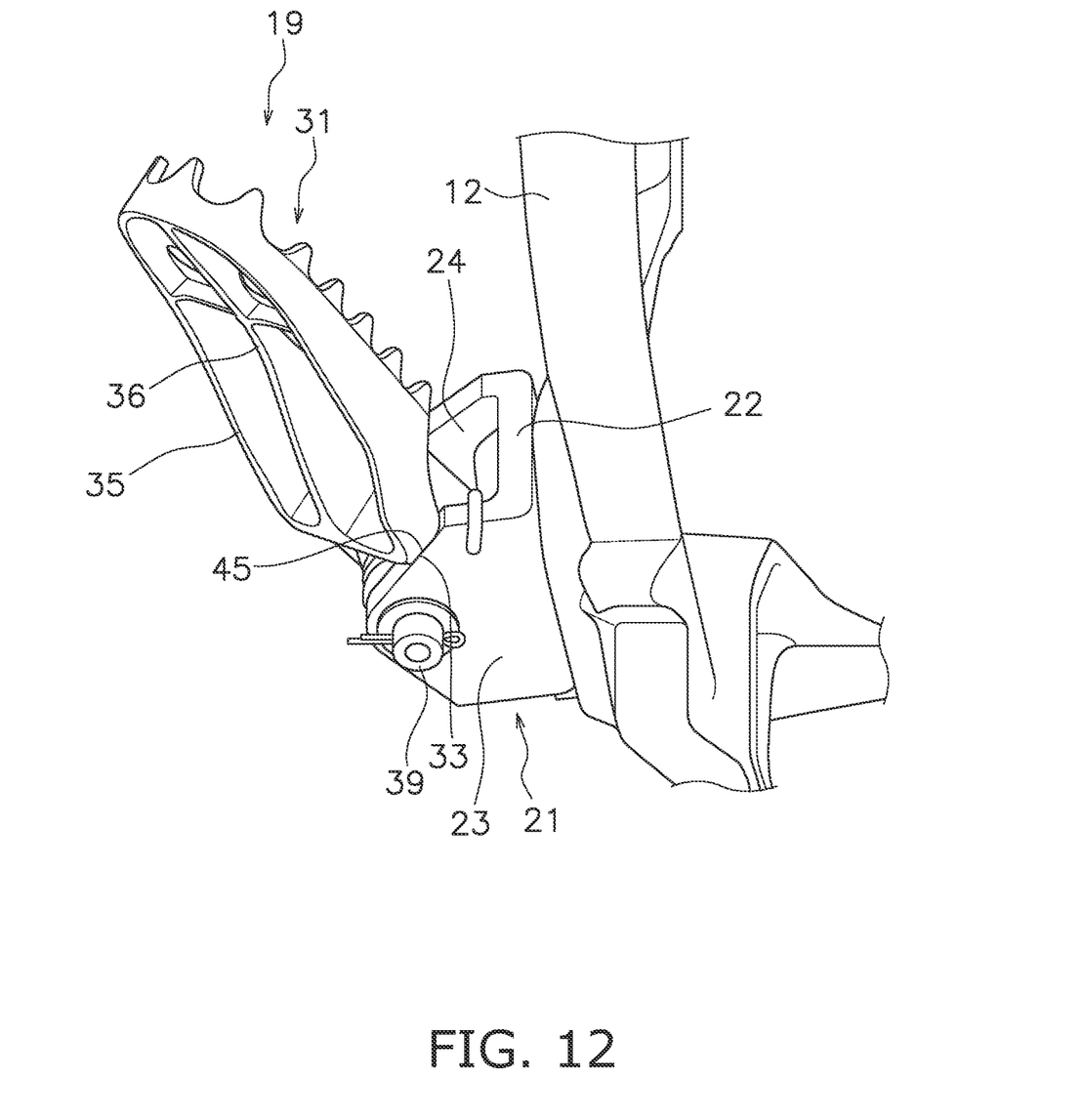
FIG. 12 is a perspective view showing the footrest support structure at the folded position.

The first contact portion 33 contacts the bracket 21 at the folded position. The second contact portion 34 contacts the bracket 21 at the expanded position. FIG. 11 is a perspective view showing the footrest support structure at the expanded position. FIG. 12 is a perspective view showing the footrest support structure at the folded position. As shown in FIG. 11, the first extending portion 23 includes a receiving surface 45. As shown in FIG. 12, the receiving surface 45 contacts the first contact portion 33 in a state where the footrest 19 is disposed at the folded position.

The receiving surface 45 is located on the first outer edge 29 in the first extending portion 23. The receiving surface 45 is inclined with respect to the surface of the base portion 22. The receiving surface 45 has a flat shape. As shown in FIG. 5, as seen in the vehicle rear view, the receiving surface 45 is inclined upward and inward in the left-right direction.

The first contact portion 33 is provided on an outer side surface of the footrest body 31. The first contact portion 33 is provided at a corner of the outer frame 35. The first contact portion 33 has a flat shape. The first contact portion 33 comes into surface contact with the receiving surface 45. As a result, the rotational movement of the footrest 19 toward the folded position is restricted.

The second contact portion 34 is connected to the connecting portion 32. In a state where the footrest 19 is located at the expanded position, the second contact portion 34 extends towards the base portion 22. A tip of the second contact portion 34 has a flat shape. In a state where the footrest 19 is located at the expanded position, the tip of the second contact portion 34 contacts the base portion 22. As a result, the rotational movement of the footrest 19 toward the expanded position is restricted.

Figure 13:
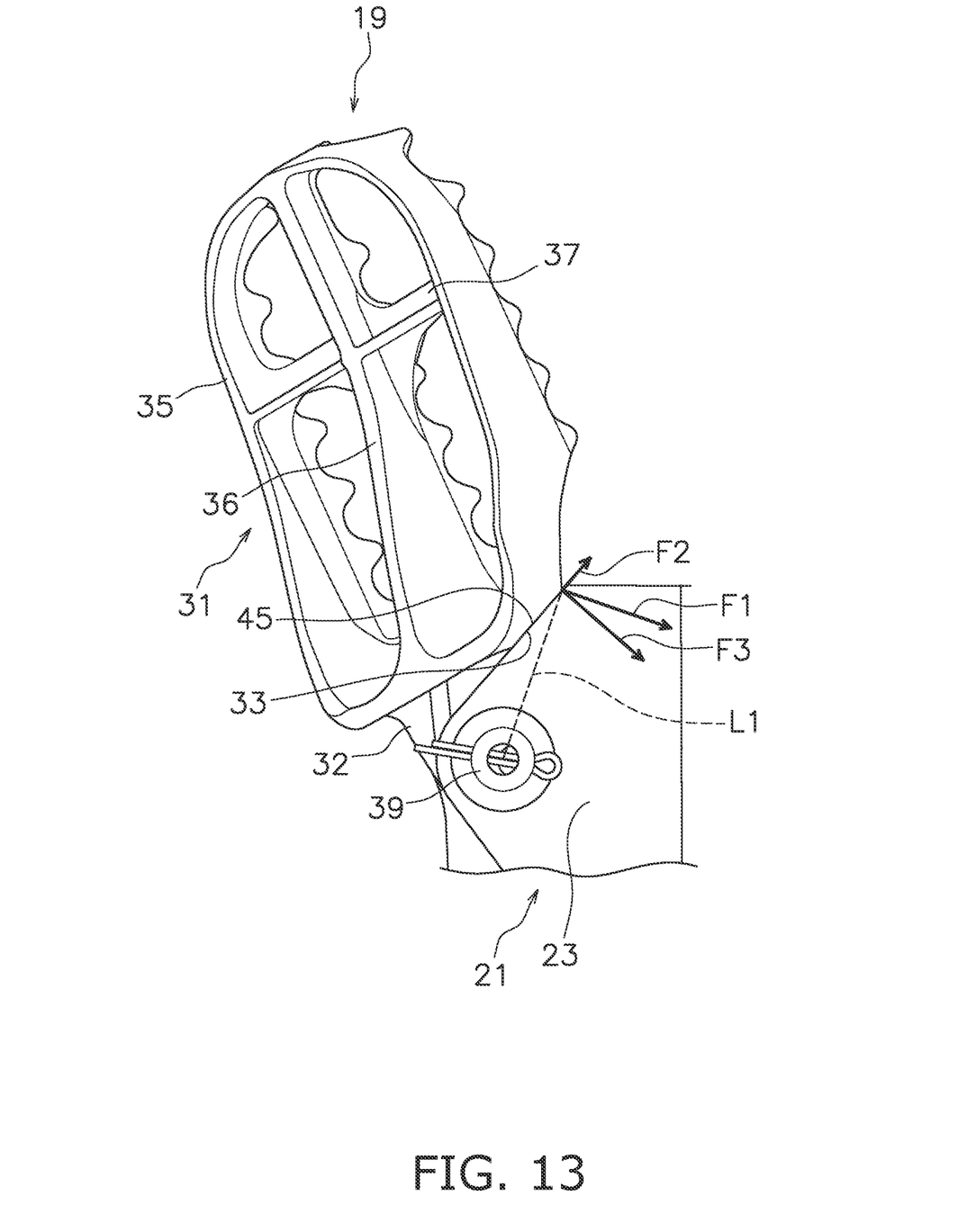
FIG. 13 is a diagram showing a load acting on the bracket from the footrest.

As shown in FIG. 13, in a case where the footrest 19 is disposed at the folded position, the load F1 from the end portion of the first contact portion 33 acts on the receiving surface 45. The load F1 acts on the receiving surface 45 in a direction perpendicular to a straight line L1 connecting a center of the support shaft 39 and an end of the first contact portion 33. A component force in a direction parallel to the receiving surface 45 of the load F1 is defined as a first component force F2. A component force in a direction perpendicular to the receiving surface 45 of the load F1 is defined as a second component force F3. The first component force F2 corresponds to a force that causes the first contact portion 33 to bite into the receiving surface 45. Therefore, the larger the first component force F2, the easier it is for the first contact portion 33 to bite into the receiving surface 45. In the footrest support structure according to the present embodiment, as shown in FIG. 13, the first component force F2 is smaller than the second component force F3.

Therefore, it becomes difficult for the first contact portion 33 to bite into the receiving surface 45.

In the straddled vehicle 1 according to the present embodiment described above, the receiving surface 45 is located on the first outer edge 29 of the first extending portion 23 of the bracket 21. Therefore, the angle of the receiving surface 45 is arbitrarily set by adjusting the shape of the first outer edge 29. Therefore, the receiving surface 45 can be easily set at an appropriate angle in order to suppress biting of the footrest 19.

Since there is no protrusion on the base portion 22, the bracket 21 has a simple structure. As a result, a decrease in the degree of freedom in the manufacturing method of the bracket 21 is suppressed. Further, since the bracket 21 has a simple structure, the soil contained in the bracket 21 is easily discharged. As a result, the operability of the footrest 19 is improved.

The first outer edge 29 is located closer to the footrest 19 than the base portion 22. Therefore, the receiving surface 45 is disposed closer to the footrest 19 than the base portion 22. As a result, the first contact portion 33 becomes smaller, so that the footrest 19 is made lighter.

Although one embodiment of the present invention has been described above, the present invention is not limited to the above embodiment, and various modifications can be made without departing from the gist of the invention.

The straddled vehicle 1 is not limited to the off-road type, but may be another type of vehicle such as a street type or a moped. The shape of the footrest 19 is not limited to that of the above embodiment, and may be changed. The shape of the bracket 21 is not limited to that of the above embodiment, and may be changed. For example, in a case where the footrest 19 is located at the folded position, the angle of the receiving surface 45 may be set so that the first component force F2 becomes zero.

Figure 14:
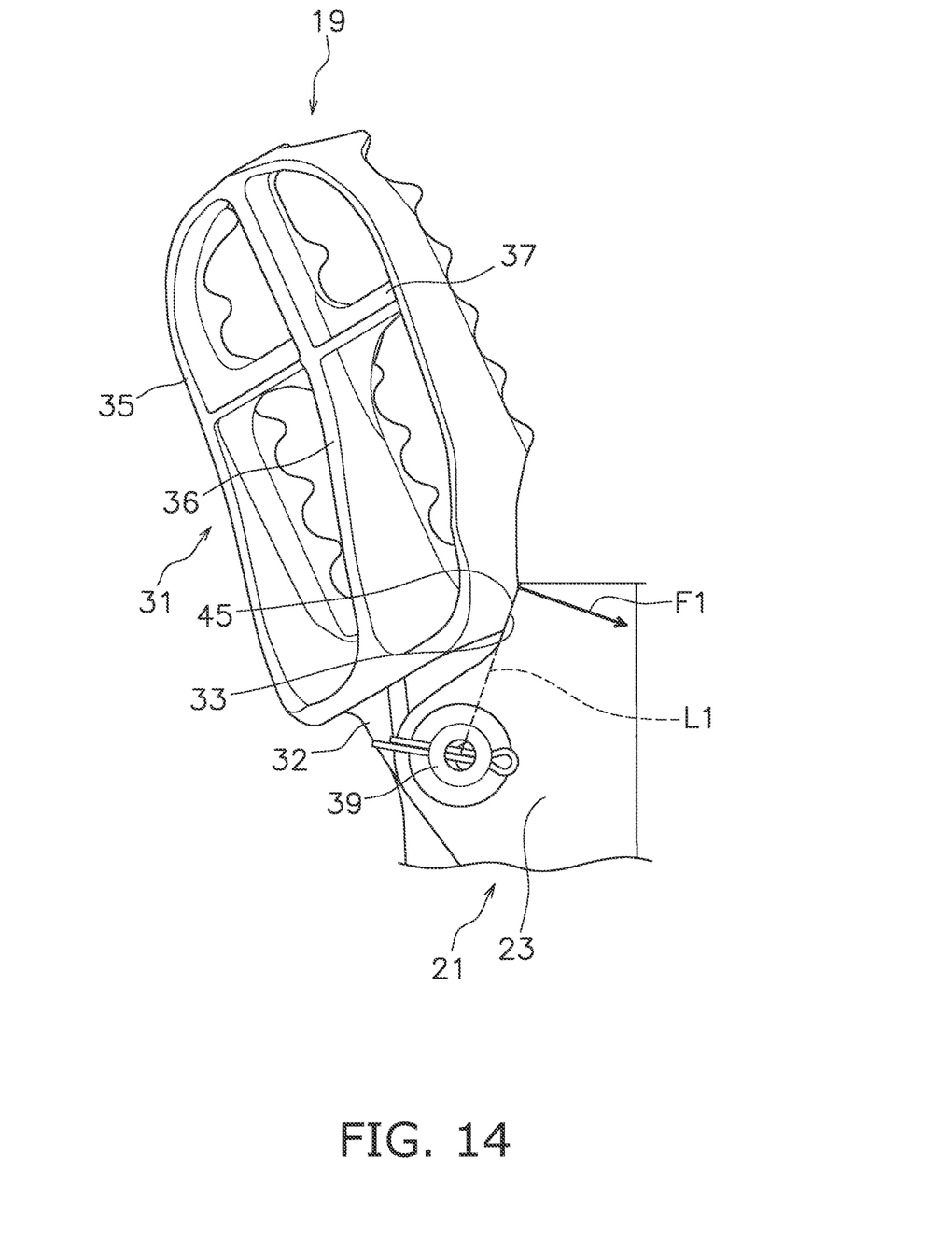
FIG. 14 is a rear view showing the footrest support structure at the folded position according to a modified example.

FIG. 14 is a rear view showing a footrest support structure according to a modified example. As shown in FIG. 14, the receiving surface 45 is parallel to the straight line L1 connecting the center of the support shaft 39 and the end of the first contact portion 33. In this case, the first component force F2 becomes zero. As a result, it becomes more difficult for the first contact portion 33 to bite into the receiving surface 45.

REFERENCE SIGNS LIST

2: Vehicle body frame, 19: Footrest, 21: Bracket, 22: Base portion, 23: First extending portion, 33: First contact portion, 45: Receiving surface, F1: Load, F2: First component force, F3: Second component force

The invention claimed is:

1. A straddled vehicle comprising:
a vehicle body frame;
a bracket attached to the vehicle body frame; and
a footrest supported by the bracket so as to be movable between
an expanded position, at which the footrest extends outward from the vehicle body frame in a left-right direction of the straddled vehicle, and
a folded position, at which the footrest is rotated upward from the expanded position, wherein
the bracket includes
a base portion disposed along the vehicle body frame, and
an extending portion extending outward from the base portion in the left-right direction, the extending portion having, at an outer edge thereof in the left-right direction, a receiving surface; and
the footrest includes a contact portion, which is configured to contact the receiving surface of the bracket when the footrest is at the folded position.

2. The straddled vehicle according to claim 1, wherein each of the base portion and the extending portion has a flat plate shape, and
the base portion and the extending portion are so positioned that the bracket has a bent shape.

3. The straddled vehicle according to claim 1, wherein the receiving surface is inclined with respect to a surface of the base portion.

4. The straddled vehicle according to claim 1, wherein the contact portion has a flat shape, and is provided on an outer side surface of the footrest.

5. The straddled vehicle according to claim 1, wherein the receiving surface and the contact portion are so shaped that, when the footrest is located at the folded position, a load from the contact portion acts on the receiving surface, the load including
a first component force in a direction parallel to the receiving surface, and
a second component force in a direction perpendicular to the receiving surface, the first component force being less than the second component force.

6. The straddled vehicle according to claim 1, wherein the receiving surface and the contact portion are so shaped that, when the footrest is located at the folded position, a load from the contact portion acts on the receiving surface, a component force of the load in a direction parallel to the receiving surface being zero.

7. The straddled vehicle according to claim 1, wherein the bracket is made of a material having a lower hardness than the footrest.

8. The straddled vehicle according to claim 1, wherein the bracket is made of aluminum.

9. The straddled vehicle according to claim 1, wherein the footrest is made of stainless steel, chrome molybdenum steel, or titanium.

10. The straddled vehicle according to claim 1, wherein the extending portion rotatably supports the footrest.

11. A footrest support structure for a straddled vehicle including a vehicle body frame, the footrest support structure comprising:
a bracket attached to the vehicle body frame; and
a footrest supported by the bracket so as to be movable between
an expanded position, at which the footrest extends outward from the vehicle body frame in a left-right direction of the straddled vehicle, and
a folded position, at which the footrest is rotated upward from the expanded position, wherein
the bracket includes
a base portion disposed along the vehicle body frame, and
an extending portion extending outward from the base portion in the left-right direction, the extending portion having, at an outer edge thereof in the left-right direction, a receiving surface; and
the footrest includes a contact portion, which is configured to contact the receiving surface of the bracket when the footrest is at the folded position.

* * * * *